Nov. 15, 1949
C. W. NORTON
2,487,890
TYPEWRITER FOR JUSTIFYING LINES
Original Filed July 8, 1944
10 Sheets-Sheet 3
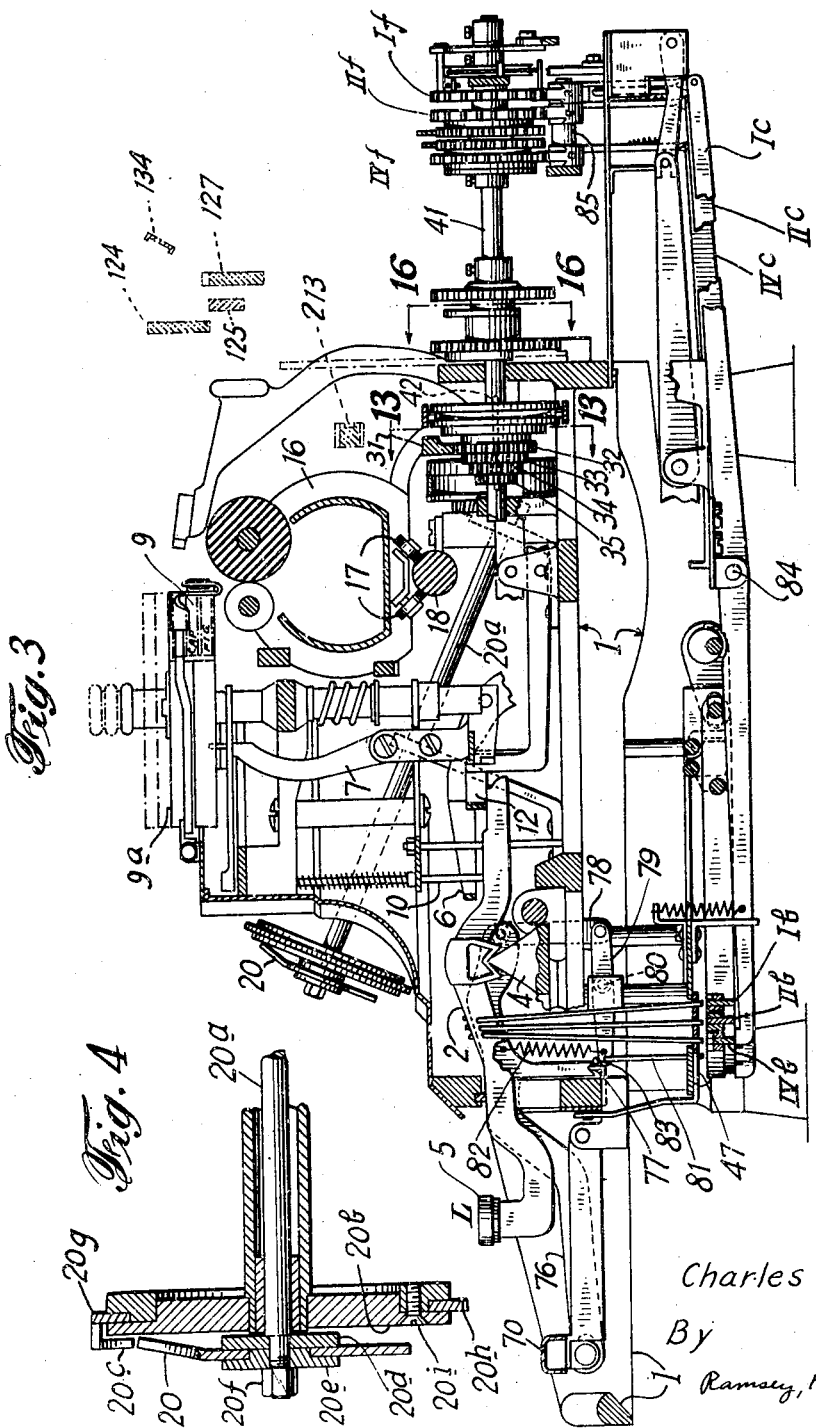
Inventor
Charles W. Norton
By
Ramsey, Kent + Chisholm
Attorneys Nov. 15, 1949     C. W. NORTON     2,487,890
TYPEWRITER FOR JUSTIFYING LINES
Original Filed July 8, 1944     10 Sheets-Sheet 4
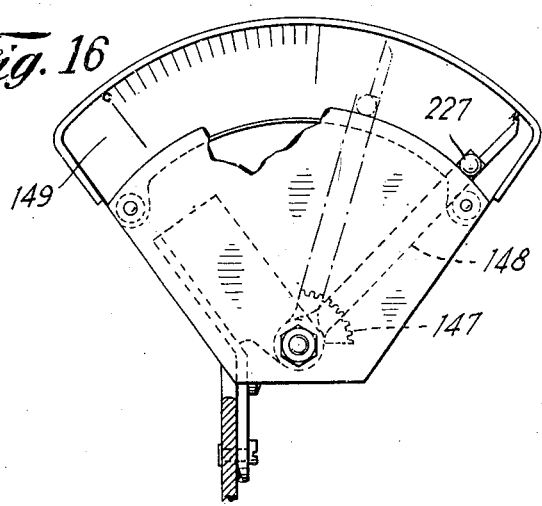
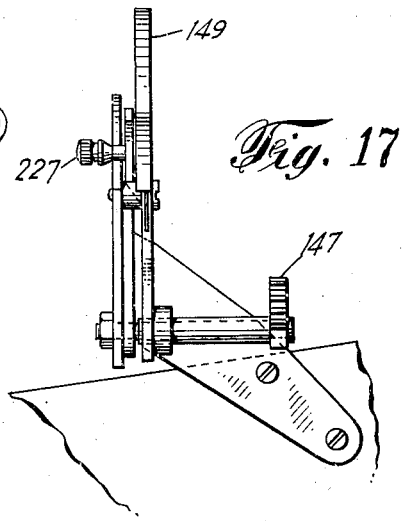
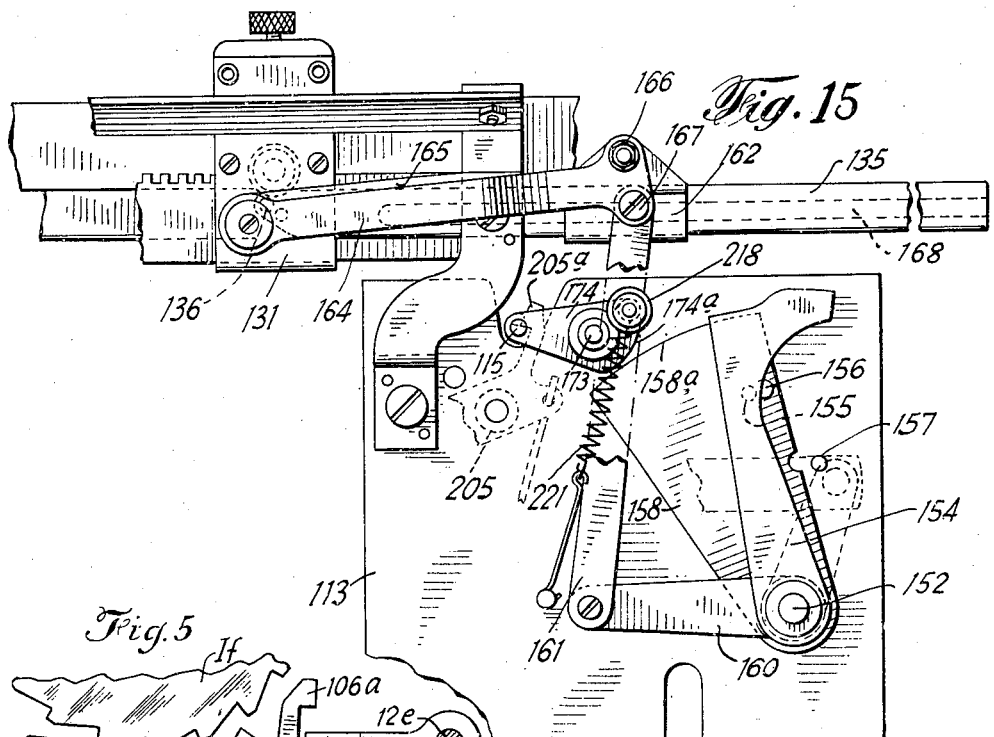
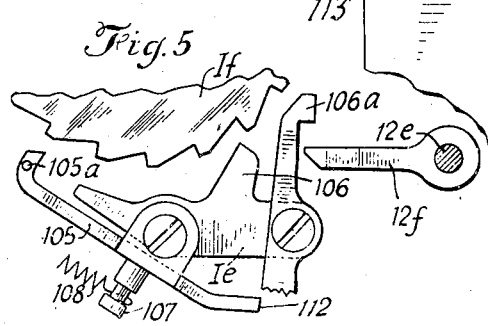
Inventor
Charles W. Norton
By Ramsey, Kent & Chisholm
Attorneys

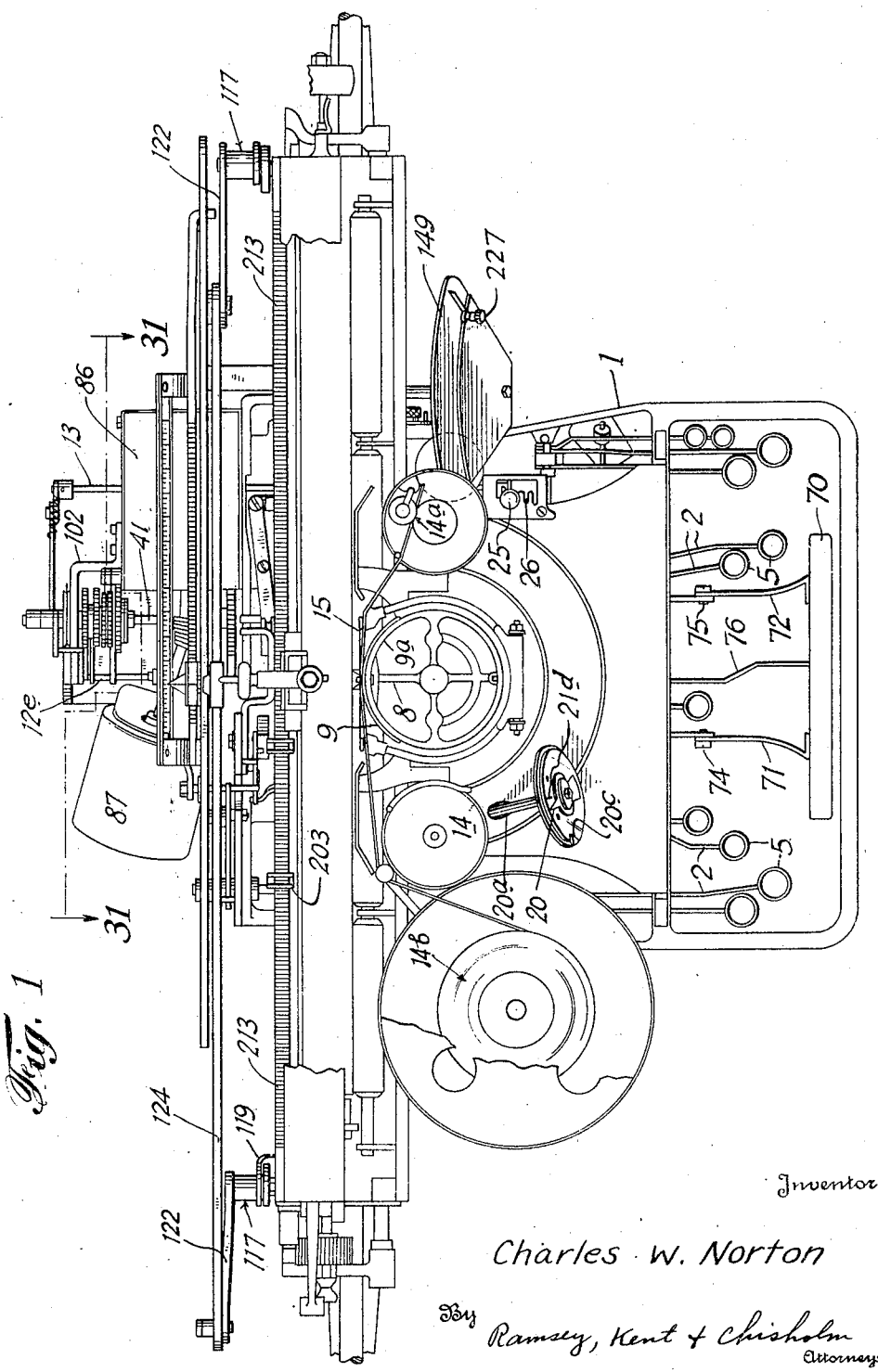

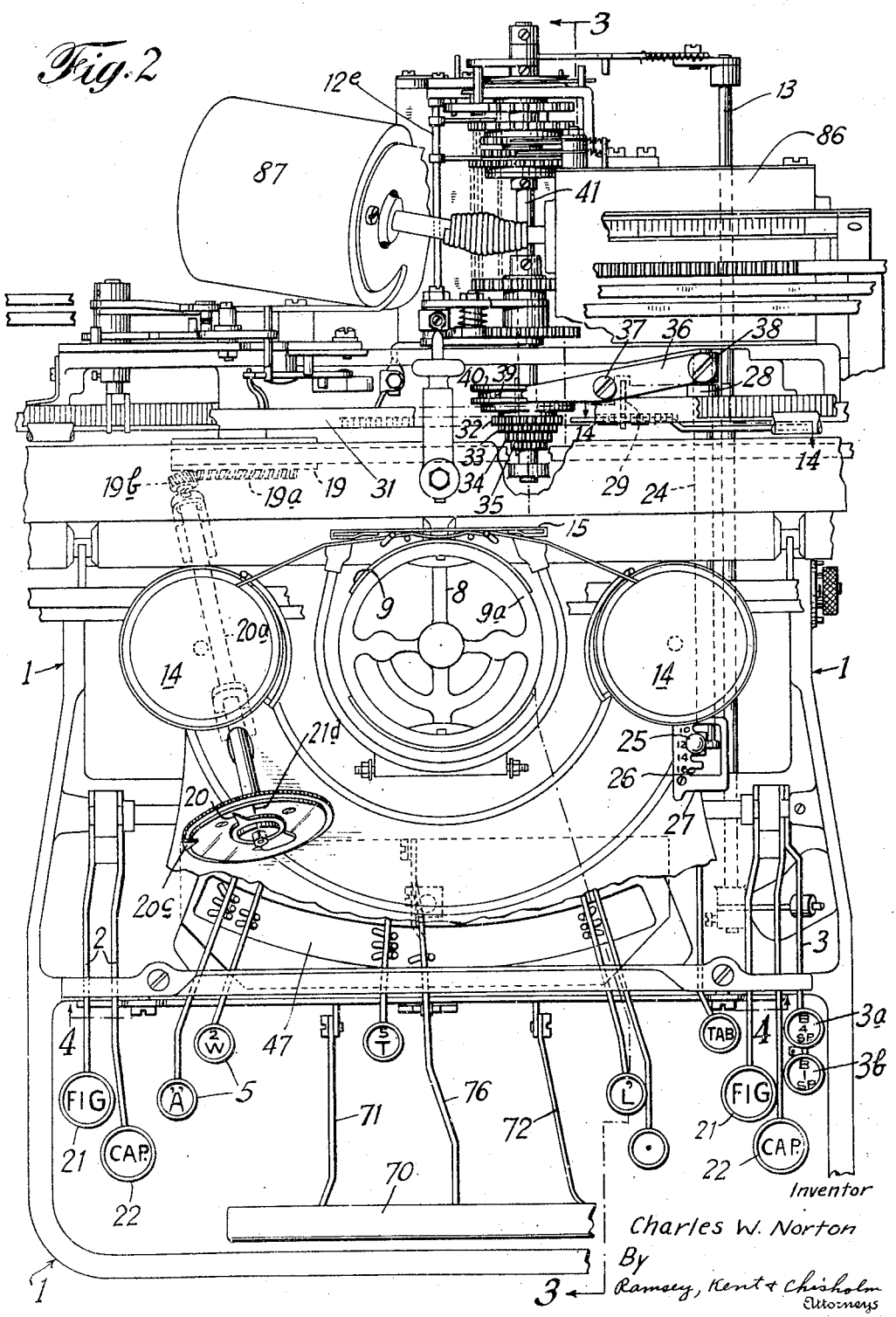

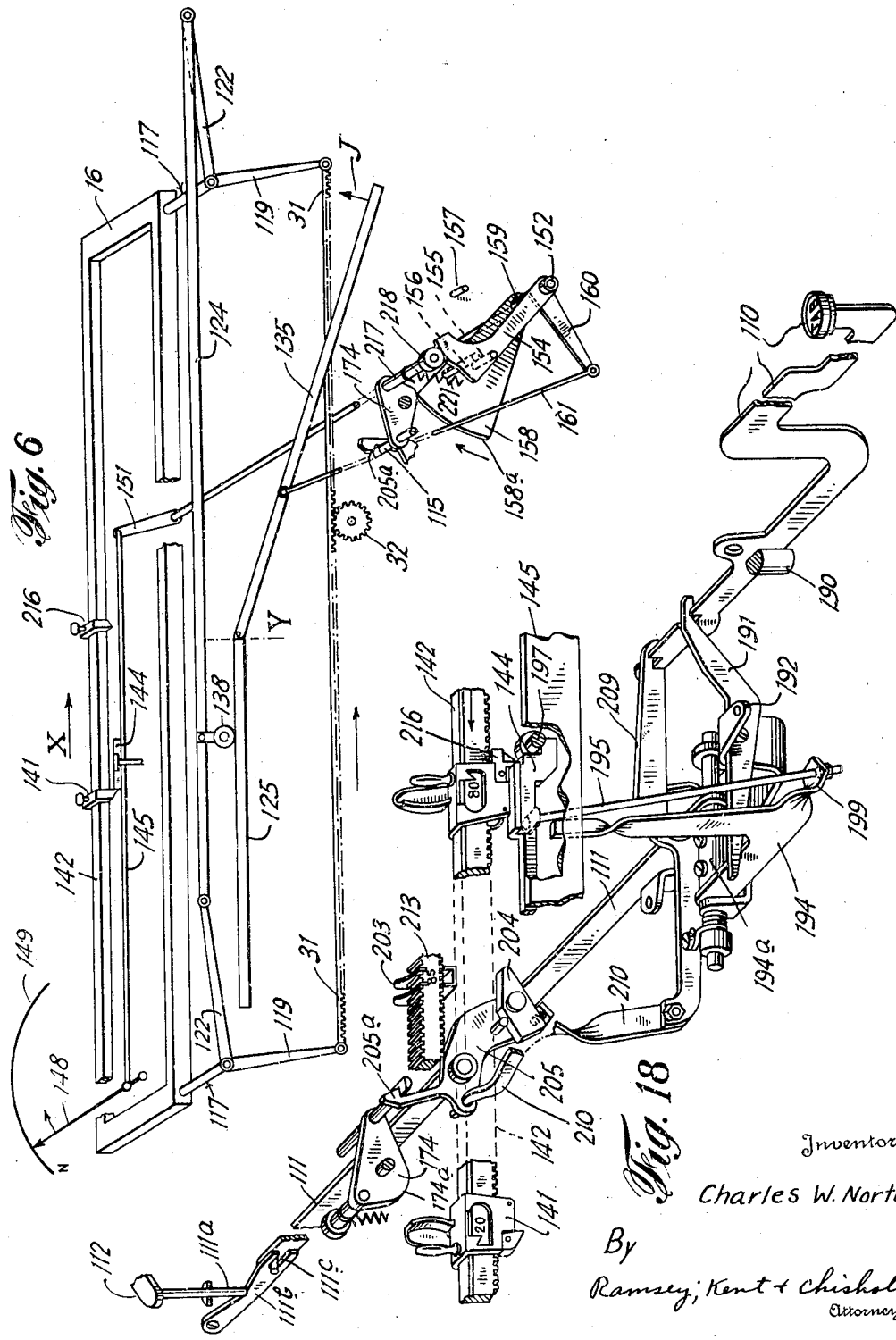

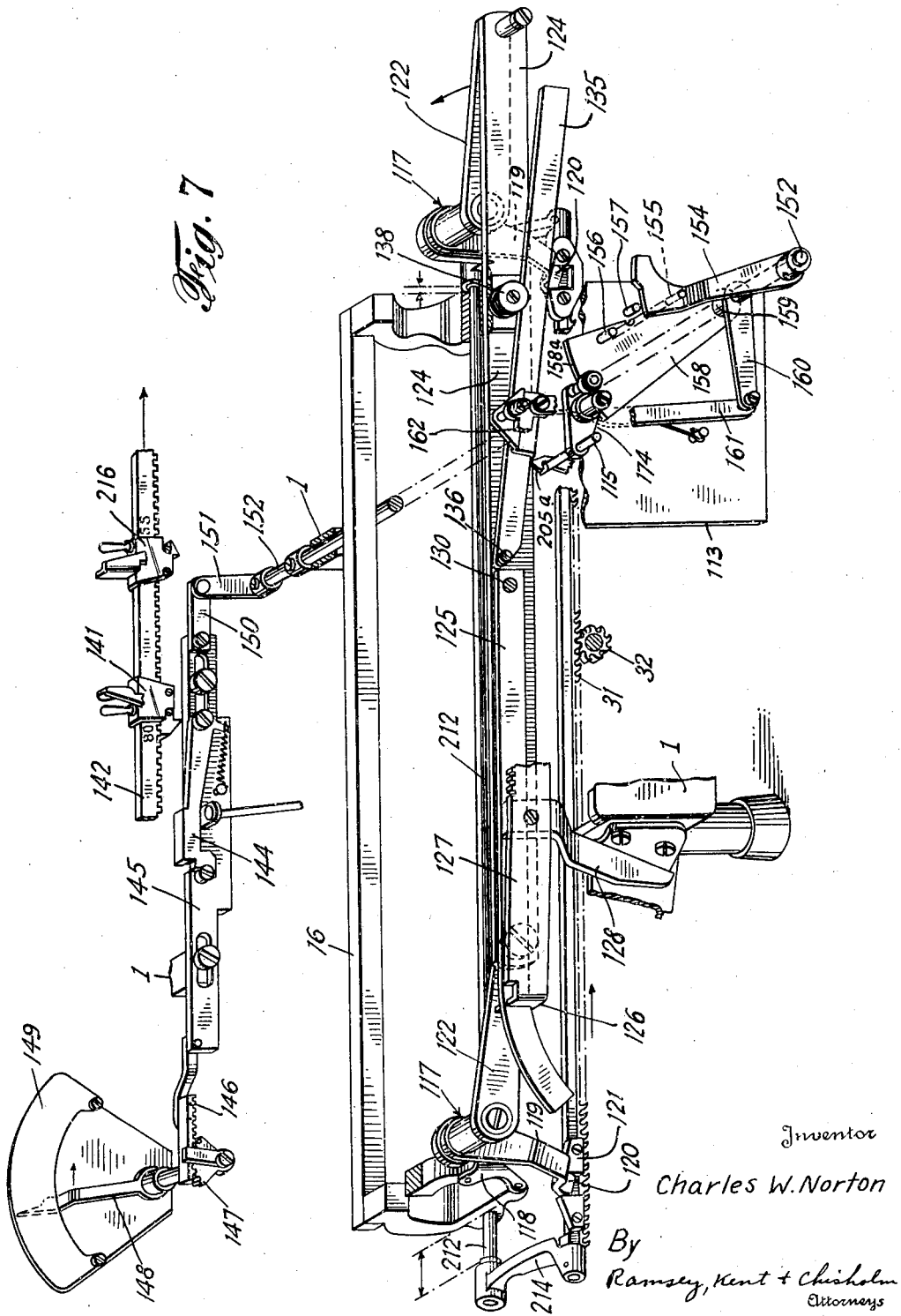

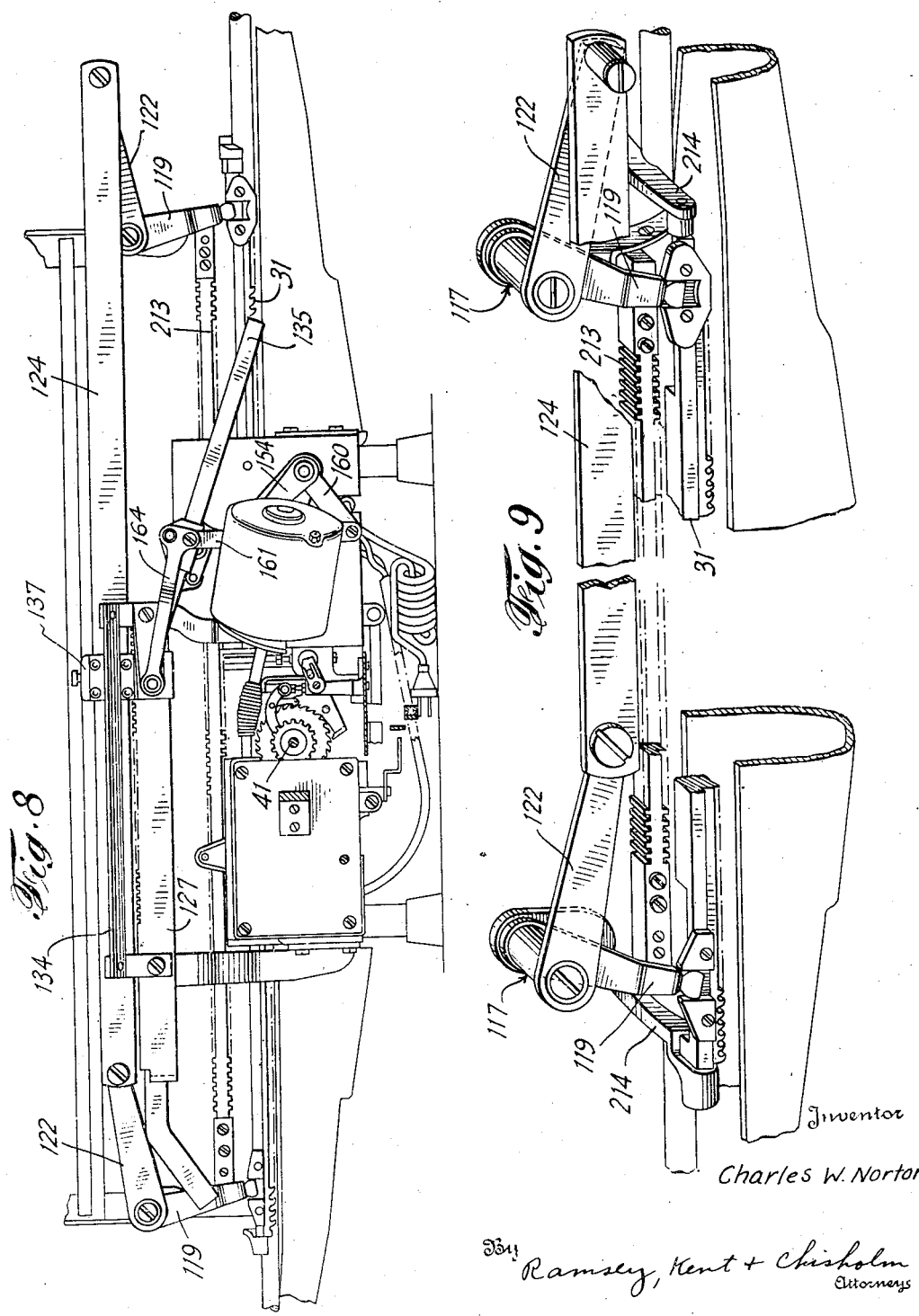

Nov. 15, 1949     C. W. NORTON     2,487,890
TYPEWRITER FOR JUSTIFYING LINES

Original Filed July 8, 1944     10 Sheets-Sheet 8

Inventor
Charles W. Norton
By Ramsey, Kent & Chisholm
Attorneys

Nov. 15, 1949        C. W. NORTON        2,487,890
TYPEWRITER FOR JUSTIFYING LINES
Original Filed July 8, 1944        10 Sheets—Sheet 9
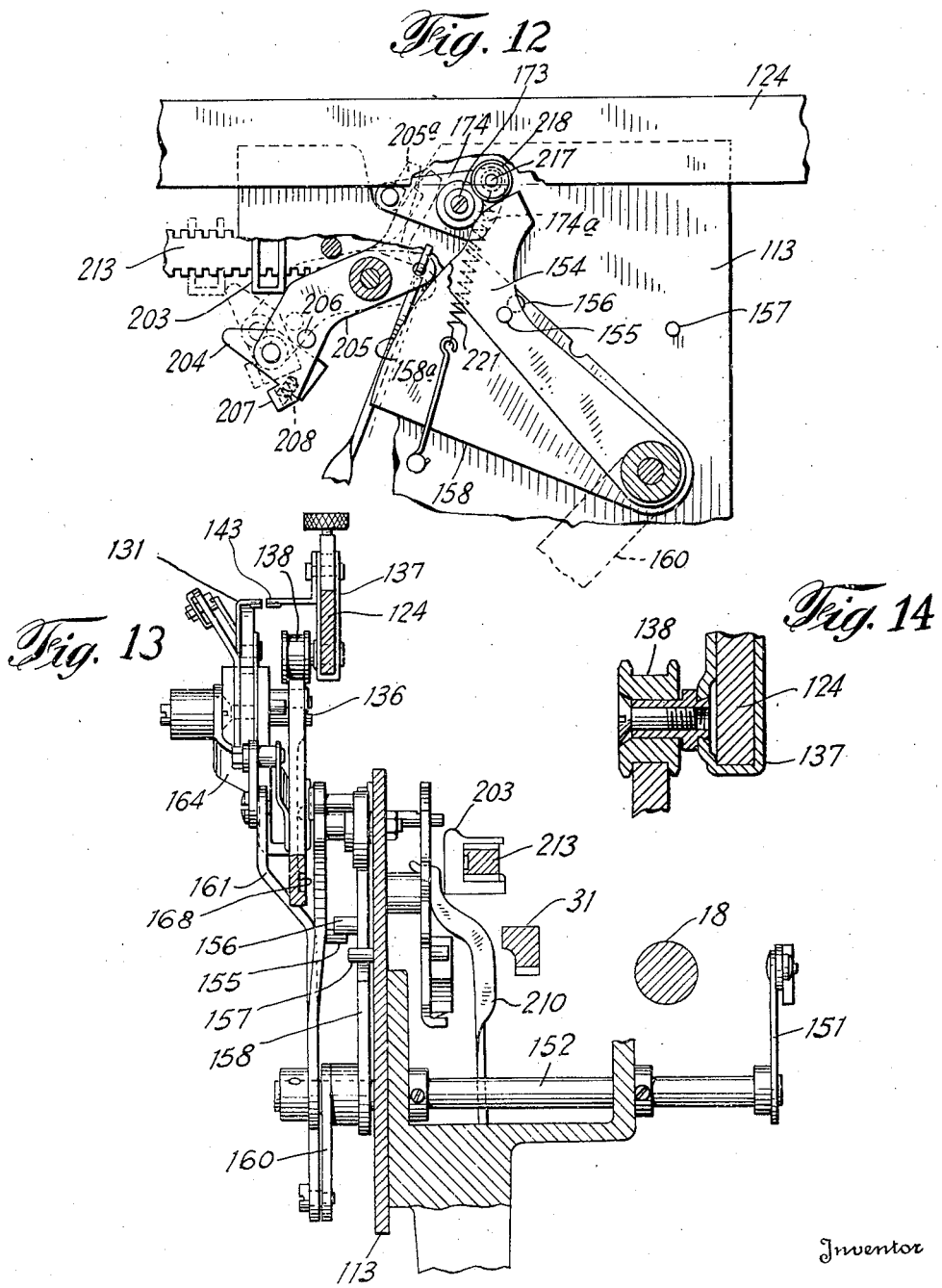
Inventor
Charles W. Norton
By Ramsey, Kent + Chisholm
Attorneys

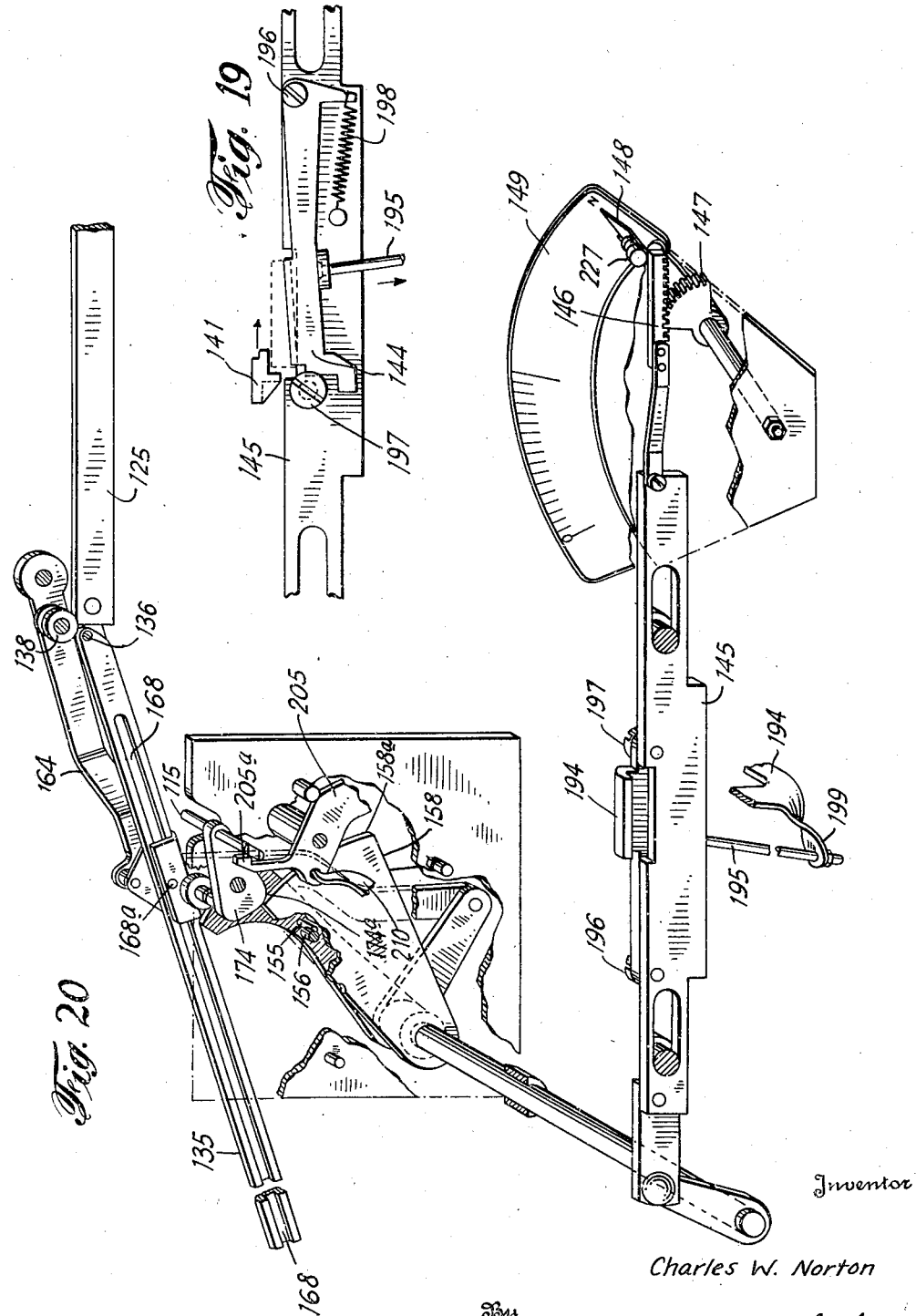

Patented Nov. 15, 1949

2,487,890

UNITED STATES PATENT OFFICE 2,487,890

TYPEWRITER FOR JUSTIFYING LINES

Charles W. Norton, West Orange, N. J., assignor to Ralph C. Coxhead Corporation, New York, N. Y., a corporation of Delaware Original application July 8, 1944, Serial No. 543,981. Divided and this application June 26, 1946, Serial No. 679,424

11 Claims. (Cl. 197—84)

This invention relates to typewriting machines and as illustrated is embodied in a machine known in the art as a "Varityper," in which a supporting wheel carries interchangeable type shuttles, so that various styles and sizes of type may be used at will. This application is a division of my application, Serial No. 543,981, filed July 8, 1944, which has matured into Patent No. 2,405,-974, issued August 20, 1946.

Machines according to this invention are capable of producing typed sheets in simulation of ordinary printed matter which may be used as "make ready" for reproduction by photolithographic or other printing processes. The printing type, however, must be given various conventional dimensions as to width, and it is desirable that different styles and sizes of type, such as occur in ordinary printed matter in the way of headings, emphasis and the like may be used. Means for attaining this result is disclosed in my Patent No. 2,298,805, issued October 13, 1942.

The invention disclosed herein is adapted for use in producing a typed sheet in characters of conventional dimensions differently spaced in many different fonts of type; to accomplish this result requires a novel coordination of the different mechanisms and devices which must be conjointly employed; and it provides mechanism whereby the carriage feed, normally advanced according to the varying width of the different characters, may be controlled for justification of the lines to uniform length.

The combination involves the utilization of a paper carriage of sufficient width to permit the use of a relatively wide sheet of paper. In typing, an uneven or unjustified line is written in a column on the left of the paper, and a justified line is then written in a column on the right, after the operation of a tabulator key. When approaching the end of an unjustified line, the carriage rings a bell, or establishes some other signal, after which the operator may type a few more characters before the ultimate limit is reached. This signal is similar to the margin signal of the ordinary typewriter. The operator, having finished writing the unjustified line, depresses a tabulator key which automatically releases the carriage so that it may move to the left-hand margin of a new or second column at the right of the sheet of paper, and the operator then writes the same line over in this second column, the machine automatically justifying this rewritten line so that it occupies a standard length. This result is obtained by automatic action of the machine.

An object of the invention is to improve and adapt justifying mechanism to a platen carriage control which affords advance of the carriage in accordance with the different widths of the typed characters.

Another object of the invention is to provide a mechanism of the kind which is both simple and automatic so that it may be used by any typist without special training or skill in its operation.

Further objects and advantages will become apparent in the description of the invention, taken in connection with the accompanying drawings comprising a part of this specification and in which like parts are designated by like characters.

In the claims as well as in the description parts are identified by specific names for convenience, but such nomenclature is intended to be as generic in its application to analogous parts as the prior art will permit. The best form in which I have contemplated applying my invention is illustrated in the accompanying drawings forming a part of this application, in which Fig. 1 is a plan view of one form of machine embodying the present invention, and showing a paper strip ribbon feed.

Fig. 2 is a plan view of a preferred form of typewriting machine with such parts omitted as are well-known in the art and may not be necessary to a complete understanding of the present invention, and showing a fabric ribbon feed.

Fig. 3 is a vertical section on the line 3—3 of Fig. 2.

Fig. 4 is a vertical sectional view of the indicator for positioning the carriage for the left-hand margin of unjustified and justified lines.

Fig. 5 is a detailed view of the escapement dog and a portion of the escapement wheel that is released when the tabulating key is depressed, and shows the detent disengaged from the teeth of the escapement wheel.

Fig. 6 is a diagrammatic view illustrating the principles of construction of the justification mechanism.

Fig. 7 is a perspective view of the mechanism, with shaft 152 displaced whereby justification of the typewritten line is accomplished.

Fig. 8 is an elevational view of the justification mechanism from the back of the machine.

Fig. 9 is a perspective view showing certain details of the justification mechanism with parts broken away.

Fig. 12 is a detail view of a holding mechanism for the sine bar shown on line 12—12 of Fig. 10.

Fig. 13 is a sectional view illustrating the sine bar holding mechanism taken on line 13—13 of Fig. 11.

Fig. 14 is a detail view of the roller on the control bar.

Fig. 15 is a detail view of the sine bar and holding mechanism therefor.

Fig. 16 is a detail view of the pointer for showing the remaining unjustified line space.

Fig. 17 is an end elevation of the construction shown in Fig. 16.

Fig. 18 is a perspective view of the tabulator key and connected mechanism in normal position.

Fig. 19 illustrates the stop on the operating bar which is releasable by the tabulating key preparatory to typing the justified line.

Fig. 20 is a perspective view from the front of the machine immediately after the carriage has been placed in position for typing an unjustified line, showing the sine bar holding dog about to be latched in inoperative position.

Figure 10:
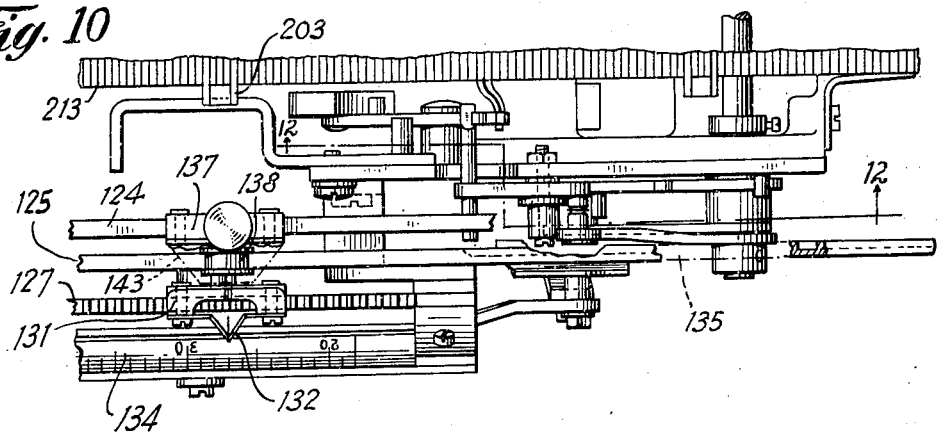
Fig. 10 is a plan view illustrating details of mechanism for setting the justification sine bar.

The machine herewith illustrated and described is of the key controlled shuttle type, where the printing impression is formed by the impact of a printing hammer which forces the paper against the ribbon and type. The particular machine with which the present embodiment of the invention is illustrated is known in the art as the "Varityper." It comprises a main frame 1 which carries the mechanism of the machine. Type keys 2 (only a few being illustrated) are mounted on a pivot bar 4 (Fig. 3) supported by the main frame 1. These type keys 2 at their front ends carry finger buttons 5 and at the rear ends cooperate with the actuator bars 6 (one of which is shown in Fig. 3) to operate the actuators 7. These actuators 7 swing the shuttle arm 8 (Fig. 1) so that it oscillates the shuttle 9 on an anvil 9a to bring the proper type to the printing point. Stop rods 10 are provided over each type key lever 2 to engage the shuttle arm 8, thereby definitely positioning the proper type at the printing point when a type key is operated. This mechanism is old in the art and will not be described in detail. See patent to Trego No. 1,880,592, October 4, 1932.

The universal bar 12 (Fig. 3) actuates the ribbon mechanism comprising ribbon spools 14 (Fig. 2), a ribbon guide 15, and other mechanism not illustrated in detail since this construction is well-known in the art. See patent to Trego No. 1,930,068, October 10, 1933. Fig. 1 illustrates a paper strip ribbon feed 14a and paper ribbon spool 14b.

The paper carriage 16 (Fig. 3) is provided with antifriction rolls 17 which travel upon the carriage supporting rod 18 as the carriage moves to the left under the influence of the carriage spring. This mechanism is also old and well-known in the art and therefore will not be described in detail.

In typewriting machines in which the carriage feed advances a uniform distance for each letter, character or space, there is no problem involved in returning the carriage to a definite starting position for each line; but where the feed mechanism is adapted to modification of the carriage movement according to varying conventional widths of the characters employed it becomes important to make sure that each line starts in even vertical alignment.

The carriage 16 is moved in letter space direction by a carriage spring which is mounted in a drum 19 (Fig. 2) that carries a band which is attached to the carriage, as is very well-known in the art. The drum 19 is provided with a bevel gear 19a which meshes with a bevel pinion 19b that is secured to the shaft 20a (Fig. 4) to rotate this shaft 20a when the drum 19 turns as the carriage is moved. The shaft 20a carries a pointer 20 that is mounted between friction discs 20d and 20e which are held in place by a nut 20f that is threaded on the shaft 20a. The construction is such that the pointer 20 may be set, as hereinafter explained, with reference to the dial 20b. The dial member carries a bezel 20g which has an index point 20c. This bezel 20g is held in place by a friction ring 20h by screws 20i that pass through the dial member, so that the bezel 20g may be set and held in set position for the purpose explained.

The machine is provided with shift keys 21 (Fig. 2) designated as "Fig." which position certain characters for operation at the printing point, and with shift keys 22 designated as "Cap" which position capital letters at the printing point. This mechanism is also well-known in the art and is described in the patent to Spaloss No. 2,051,112, August 12, 1936.

In my application Serial No. 543,981, filed July 8, 1944, of which this application is a division, I have described in detail the mechanism by which different space values corresponding to conventional widths of the various letters and characters as in ordinary printing are provided for by the carriage escapement; and while that feature is the occasion of a line justification problem met by this invention, its consideration and description is not necessary for an understanding of the justification mechanism to which this application relates.

Line justification

Reference will be had to Fig. 6 which illustrates diagrammatically the mechanism for accomplishing justification. The carriage 16 is movable for letter space movement from left to right (as viewed from the rear of the machine), in the direction of the arrow $x$. This carriage carries a pair of bell-cranks 117, comprising horizontal arms 122 connected by a control bar 124 and vertical arms 119 connected to an escapement rack 31. The control bar 124 is provided with a roller 138 that travels upon track bar 125 in a direction parallel to the movement of the carriage 16.

The track bar 125 (Fig. 7) is slidably mounted for adjustment with one end extending through a slot in a right angle 126 of the notched bar 127 that is fixedly mounted by a suitable bracket 128 on the machine frame 1. The other end of the track bar 125 is carried by a rivet 130 (Fig. 7) which extends from an adjustment sleeve 131 (Figs. 10 and 11) slidably mounted on the bar 127. The adjustment sleeve 131 is provided with a pointer 132 that cooperates with a scale 134. It is also provided with a suitable dog (not shown) which cooperates with the notched bar 127 to permit the track bar 125 to be set in adjusted positions relative to the scale 134 for the purpose of adjustment to the column width.

Figure 11:
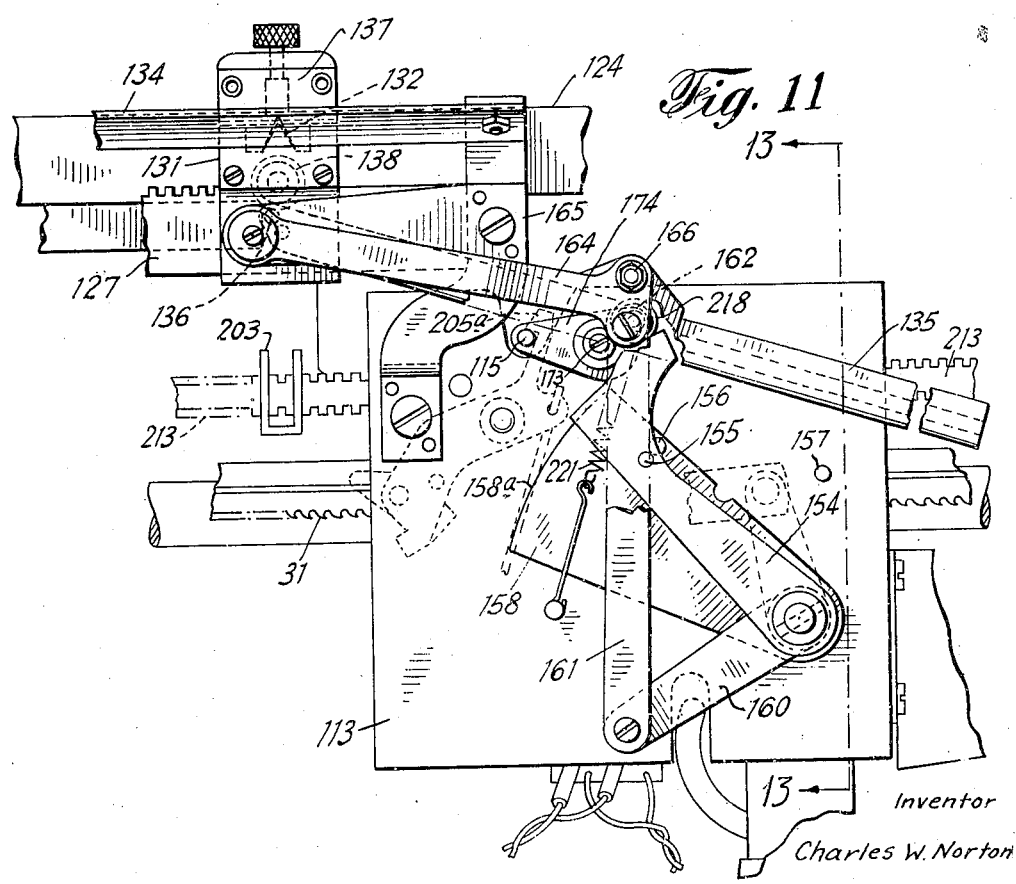
Fig. 11 is an elevational view of the mechanism shown in Fig. 10.

A sine bar 135 is pivoted at 136 to the sleeve 131 directly opposite to the pointer 132 so that the setting of the pointer 132 relative to the scale 134 indicates the position of the axis of the pivot 136 relative to the scale 134. An adjustment clamp sleeve 137 is mounted for slidable adjustment on the control bar 124 and carries a roller 138 (Figs. 10 and 11) which rides upon the upper edge of the track bar 125 and the sine bar 135. The adjustable setting of sleeve 137 on the control bar 124 determines the position of the left-hand margin of the justified column relative to the paper carriage, and to this end the clamp sleeve 137 is adjusted opposite to the pointer 132 on the adjustment sleeve 131 as shown in Figs. 10 and 11.

The sine bar 135 may be swung in a vertical direction around the pivot 136 to various degrees of inclination. It will be observed that as the roller 138 travels down the sine bar 135, when the carriage escapes from left to right (as viewed from the back of the machine), the control bar 124 is gradually lowered, and as the control bar is lowered the carriage is advanced a slight increment in addition to the normal character space each time a character is typed or a space is provided between the words.

When an unjustified line is being written the roller 138 is travelling on the horizontal track bar 125. A signal is given when the end of a written line is being approached. The operator may type a few characters after the signal to complete the unjustified line. When the signal is given, an operating dog 141 on the justifying bar 142 (Figs. 6 and 7) has engaged a block 144 on the operating bar 145 which is slidably mounted on the machine frame 1. One end of the operating bar carries a rack 146 which cooperates with a gear segment 147 to swing the pointer 148 over the indicator scale 149. The other end of the operating bar is connected by a link 150 with a crank arm 151 which is fixedly mounted on a shaft 152 that is rotatably mounted in the machine frame 1. The rear end of this shaft 152 has an upwardly extending arm 154 fixedly mounted thereon. The arm 154 is provided with a pin 155 (Figs. 7, 11 and 15) which is adapted to contact with a pin 156 on lock arm 158. Thus, as the carriage moves with the dog 141 in contact with the block 144 (to write a few characters after the signal), the shaft 152 is rotated, and actuates the adjustment or setting mechanism which positions the sine bar so that such extension of the unjustified line will be made as will justify the line when it is rewritten.

It should be observed that the sine bar lock arm 158 is itself in some respects a new device necessary for the organization of the present invention. The analogous element of the invention disclosed in my Patent No. 2,263,642 is suited to uniform carriage spacing; but when the carriage spacing is not uniform for each key stroke as in this invention the sine bar cannot attain correct justification by uniform steps, but must be advanced at each key stroke a distance proportionate to the carriage advance occasioned by that stroke. To meet that requirement, and other necessities, the sine bar lock is of special design. This sine bar lock comprises a lock arm 158 rigidly attached to a sleeve 159 rotatable upon the shaft 152 and this sleeve carries an arm 160 which is connected by a link 161 with a guide sleeve 162 through which the sine bar is slidably movable. When the adjustable sleeve 131 is moved relative to the scale 134, this guide sleeve 162 is held in position on the sine bar 135 by an oscillating link 164 (Figs. 11, 13 and 15) that is pivoted to a bracket 165 secured to the main frame. Link 164 is also pivoted at its forward end at 166 to the guide sleeve 162. By this construction the oscillating link 164 retains the guide sleeve 162 in its proper position, so that when the link 161, attached to the link 164 at the upper end 167 thereof, is raised or lowered, it correspondingly raises or lowers the sine bar. The sine bar 135 is provided with a groove 168 in which a guide pin 168a is slidable (Fig. 20), the purpose of which is to retain the guide sleeve 162 on the sine bar 135.

During the typing of the unjustified line, after the signal bell rings, each step-by-step movement of the escapement rack of the carriage, through the connections described, raises the free end of the sine bar in the direction of the arrow J (Fig. 6). The limit of movement of the sine bar is reached when the sine bar becomes aligned with the track bar 125, which means that it takes that position when all the letters possible have been written in the unjustified line. In other words, the unjustified line in such case has reached the length of the standard justified line, and so no expansion thereof is needed. When the sine bar 135 has been raised to this limit, arm 158 contacts stop pin 157, which prevents further movement. Ordinarily, however, the unjustified line is less than the full length, and as a result the sine bar more often is lifted less than the full limit of movement; but whatever position it reaches it must be locked in that position while the justified line is being written, and special mechanism is provided to that end.

It will be observed that a dog 174 (Figs. 6, 11 and 15) is pivoted on plate 113 (attached to main frame 1) and serves to lock the arm 158 in the position to which it has been moved, by the eccentric curved surface 174a (Fig. 15) bearing against the cylindrical surface 158a on the end of arm 158 because of force of the spring 221 producing a sort of toggle action when the latch finger 205a has been released from pin 115. On the return movement of arm 154, that arm contacts a roller 218 and, lifting it, disengages the dog 174 from the arm 158. It will also be observed that the lifting of roller 218 lowers pin 115, on the opposite end of dog 174, and that pin 115 again becomes engaged by latching finger 205a on a pivoted dog 205, to be hereafter described (see Figs. 11, 12 and 15). The purpose of this is to permit free movement of arm 158 except when necessary to lock the sine bar setting preparatory to rewriting the line for justification. Dog 174 is biased toward contact with arm 158 by the tension of spring 221 (Figs. 11 and 12).

Since the locking of the sine bar 135 in its adjusted position is brought about by the friction cam surface 174a, on the dog 174, engaging the friction cylindrical surface 158a on arm 158, the swinging movement of this arm 158 may be locked in any position within the scope of engagement of the two surfaces 158a and 174a. This construction therefore permits of much finer adjustments of the sine bar 135 than could be obtained by a pawl and ratchet lock. Such a friction lock is particularly desirable where the machine is capable of so many letter spacing controls as are provided by the variable spacing mechanism.

It sometimes happens that a short line occurs, as at the end of a paragraph, when the operator is writing in the unjustified column. It is desirable that such short lines should be written with normal spacing in the justified column. Since the short line is completed before the signal bell rings, the sine bar 135 is standing in its lowest position and would introduce maximum justification space if the carriage should be tabulated to the justified column at that time. So, in order to enable the operator to write the short line in the justified column with normal spacing, the pointer 148 is provided with a finger knob 227 (Figs. 6, 7 and 16) whereby the operator may manually move the pointer 148 counterclockwise when viewed from the front of the machine. This positive movement of the pointer 148 moves the operating bar 145 (Fig. 7) to turn the shaft 152, and through the connected parts to cause the link 161 to raise the sine bar 135 in exactly the same manner as if these movements were brought about automatically. If the operator moves the pointer 148 counterclockwise to the "0" on the left of the indicator scale 149 the sine bar will be horizontal and will constitute a straight line continuation of the track bar 125, so that any typing in the justified column will be written with normal spacing; that is, with the same spacing that the line had when written in the unjustified column. When the carriage is returned to again permit typing in the unjustified column the parts act to restore the sine bar to its lowest position exactly the same as if the sine bar had been raised automatically by operation of the machine instead of having been raised positively by the operator.

Before typing is begun, it is necessary to set the machine for the work to be done. This requires determining the length of lines and the position of the columns on the paper carriage. Preferably the dog 141 (Figs. 6, 7 and 18) is set first, and this setting is preferably near the center of the scale on the rack bar 142. The dog 141 operates the bell signal (see U. S. Patent 1,963,158, June 19, 1934) and shortly thereafter contacts with the block 144 (Figs. 6 and 7). The setting of this dog 141 therefore indicates the right end of the unjustified full length line. The dog 216 is preferably set next in order. This dog 216 contacts with the block 144 on the return movement of the carriage and moves the operating bar 145 to its normal position where the carriage is stopped on its return movement. Thus the setting of the stop 216 determines the position of the left-hand margin of the unjustified lines. The distance on the scale on the rack bar 142 between stops 141 and 216 is the measure of the length of the unjustified full length lines. The tabulator stop 203 (Figs. 11, 12 and 18) is set on the tabulator bar 213 several units beyond the setting of dog 141 on bar 142. The setting of the tabulator stop 203 determines the left margin of the column of justified lines. The adjustment sleeve 131 is now set relative to scale 134 as indicated in Fig. 10. The tabulator key 110 is operated and the carriage is stopped by the engagement of stop 203 with the dog 204 (dotted lines Fig. 12). While the carriage stands in this position, sleeve 137 (Figs. 10, 11 and 13) is adjusted on the control bar 124 so that indicator 143 (Fig. 13) on sleeve 137 is aligned with pointer 132 on adjustment sleeve 131. The machine is now set for operation. It will be observed that the setting of the adjustment sleeve 131 is along the bar 127 that is fixedly mounted to extend parallel to the travel of the paper carriage 16. When the adjustment sleeve 131 is adjusted along the bar 127 the sine bar 135 is slid through the guide sleeve 162, and the initial angle of the sine bar 135 to carriage travel path is changed. This automatically corrects the justification increment for different lengths of lines; for example, if the justified line is two and one-half inches long and one unit is to be distributed throughout this line the setting of the adjustment sleeve 131 at "25" on scale 134 automatically distributes this one unit throughout the total length of the line. If the justified line is four inches long, and one unit is to be distributed, the setting of the adjustment sleeve 131 opposite the "40" on the scale 134 (assuming the other elements and stops are properly set) will set the sine bar 135 so that one unit will be distributed throughout the four inch justified line. Thus it will be seen that the basic inclination of the sine bar is automatically changed for each length of line by the setting of the sleeve 131.

Having completed the typing of the unjustified line and thereby having obtained a proper adjustment of the sine bar, the operator depresses the tabulator key (Figs. 2 and 18). This key is pivoted in the main frame on the pivot block 190, so that when the key is depressed the back end of the lever is raised. A cross lever 191 is pivoted on a bracket 192, which is secured to the main frame, and bears upon the front arm of a bell crank lever 194. The front end of this bell crank lever carries a rod 195 which connects with the block 144 pivoted on a pivot screw 196 (Fig. 19) carried by the operator bar 145. This pivoted block 144 is normally urged against a stop screw 196 by the spring 198. When the tabulator key is depressed the cross lever 191 operating on the forward arm 194 of the bell crank lever pulls down on the rod 195 and pulls the block 144 out of engagement with the operating dog 141. Also a cross lever 209 pulls down on a link 210 connected to the swinging arm 205 and lifts the tabulating dog 204 pivoted on arm 205 into the path of stop 203. This results in moving latching finger 205a out of engagement with pin 115 on dog 174, permitting that member to drop into locking engagement with sine bar lock arm 158.

A rearwardly extending arm 111 (Fig. 18) is secured to sleeve 194a that carries the bell crank lever 194 so that when the cross lever 191 depresses the horizontal arm of the bell crank 194 it also rocks the sleeve 194a clockwise and lifts the rear end of the long arm 111; this, in turn, lifts the front end of the stub lever 111b, through the pin and slot connection 111c. The stub lever raises the push rod 111a which raises the tail 112 of the dog 105 (Fig. 5) and frees the escapement wheel I—f from the dog 105.

The carriage is now free to move under the influence of the carriage drive and tabulates to the position where the stop 203 on the rack 213 engages the tabulating dog 204 (Figs. 12 and 18). The dog 204 may oscillate between the stops 206 and 207 (Fig. 12) which are mounted on the swinging arm 205, and is normally held in engagement with the stop 207 by the coil spring 208. The tabulating stop 203 has been set so that the carriage has moved the roller 138, carried by the control bar 124, to the position shown in Figs. 10 and 11, so that the carriage has moved to the position corresponding to the left-hand margin of the justified column.

Assume, now, that the parts have reached the position shown in Fig. 6 and the unjustified line is completed. The operator pushes the tabulator key 110 which, through rod 195, lowers the block 144 out of the path of the operating dog 141 and, releasing the escapement wheel I—f (Fig. 5), permits the carriage to move over to the center line Y, where the roller 138 on the control bar 124 rests on the end of the sine bar 135. At this point the dog 174 has been released from finger 205a and so locks the sine bar lock arm 158 stationary, with the sine bar 135 locked in the inclined position to which it has been raised.

There is a sequence of events that occurs when the tabulator key is operated. First, latch 205a is released from pin 115 to permit the lock 174 to lock the lock arm 158 in position, thus locking the sine bar 135; second, block 144 is pulled down to permit free carriage travel; and third, escapement wheel I—f is released to release the carriage for tabulating movement.

Referring now more particularly to Fig. 7, which is a detail view looking from the back of the machine toward the front thereof, this Fig. 7 illustrates carriage frame 16 in which is slidably mounted a rod 212 that is provided with two rearwardly extending arms 214 which carry escapement rack 31 that is in engagement with a pinion 32 which is controlled by the escapement mechanism. The escapement rack 31, therefore, is capable of sliding movement relative to the paper carriage frame, as well as movement with the paper carriage frame (see also Figs. 8 and 9).

Sine bar 135 is pivoted to the track bar 125 and forms a continuation thereof so that roller 138 on control bar 124 travels directly from the horizontal track bar 125 onto the sine bar 135. Each movement of the escapement rack 31 produces a corresponding movement of the carriage 16 so long as the roller 138 remains on the horizontal track bar 125, which is throughout the writing of the unjustified line. As soon as the roller 138 reaches the inclined sine bar 135, that is, at the beginning of the justified line, the control bar drops downward a small increment for each advance movement of the roller along the sine bar. This dropping down or lowering of the control bar 124 causes a turning of the bell cranks 117 and thereby causes a relative movement between the escapement rack 31 and the carriage 16, so that the advance of the carriage now becomes the advance produced by the escapement plus the increment produced by the rotation of the bell cranks 117; so that when the operator has finished rewriting the matter of the unjustified line, it now becomes a justified line and terminates evenly with the right of the justified column.

Before starting operations, the operator moves the carriage to the right, to the position of the left end (or margin) of the first line of rough copy. Then the pointer 20, which is frictionally mounted on shaft 20a, is set opposite to the mark 21d (Figs. 1, 2 and 4). On the return of the carriage to the left margin position to write a second or succeeding line, the operator observes the relation between the pointer 20 and the line 21d. If they coincide, the operator writes the second or succeeding line. If the pointer 20 and line 21d do not coincide due to the small increments of letter spacing, the operator either back spaces the carriage or operates the space bar until the pointer 20 and line 21d are aligned. Then the rough second line may be written.

When the first rough line is completed the operator operates the tabulator and thus positions the carriage for the left margin, or start of the justified line. Before writing this first justified line, the operator turns the bezel 20g to bring the index point 20c into alignment with the end of pointer 20. Then the first justified line is written. Now when the second or any succeeding justified line is to be written the operator observes whether or not the index point 20c is aligned with the pointer 20. If not, the operator uses the back spacer or operates the space bar to make these two pointers come into alignment, and when this occurs the justified line may be written.

Without these indicators and proper corrections as explained, the margins would be irregular and the lines out of vertical alignment at their ends.

Figs. 7, 16 and 20 disclose an indicator 148 which is connected by a rack 146 and pinion 147 with the operating bar 145. This indicator swings over the scale 149 when the sine bar 135 is being set during the writing of the unjustified line, and shows the operator how many letters may be written after the warning bell (common in the art) has rung. In other words, it is the indicator for the right end of the unjustified line and shows the possible maximum limit of length of the line that may be written.

When a line is short, as at the end of a paragraph, the unjustified line may not be long enough to properly set the sine bar, and the justification would be excessive. When this happens, the operator uses the knob 227 to move the indicator over the scale 149 which is in the justification zone. This moving of the indicator 148 raises the sine bar, which is then automatically locked in raised position (see Figs. 7 and 20).

After the justified line has been written the operator returns the paper carriage to its right-hand position (viewed from the front of the machine) to begin writing a new unjustified line. On this return, dog 216 on the bar 142 engages block 144 (Fig. 7) and moves the operating bar 145 with the carriage, and rack 146 cooperating with the gear segment 147 swings the pointer 148 to the starting position, as shown in full lines in Fig. 16. The movement of the operating bar to the left (Fig. 15) turns the shaft 152 counterclockwise and swings the arm 154 to cause the upper end thereof to engage a roller 218 on the holding dog 174. The upper end of the lever 154 cams roller 218 upward and disengages the dog 174 from the sine bar latch 158 and again latches pin 115 beneath latch 205a. The weight of the pivoted sine bar now causes the bar to drop to its lowest or most inclined position. As the bar drops it swings the arm 158 counterclockwise due to the downward pressure on the link 161 operating through the arm 160 and the sleeve 159. Thus the machine is ready for the next line.

It is to be understood that while the invention is described herein as applicable to a typewriting machine of the kind known as a "Varityper" it is capable of use in its broader aspects with typewriting machines of other kinds, and is not to be understood as limited in its scope other than as indicated in the claims.

What I claim is:

1. In a justifying typewriting machine, in combination, a movable paper carriage, an escapement rack on said paper carriage, an escapement mechanism cooperating with said escapement rack for controlling the spacing movement of said paper carriage, justification mechanism for imparting movement to said carriage relative to said rack, means controlled by movement of said carriage for setting said justification mechanism, tabulator mechanism, and a friction lock rendered active by said tabulator mechanism for locking said justification mechanism in any set position.

2. In a justifying typewriting machine, a movable paper carriage, an escapement rack on said paper carriage, an escapement mechanism for controlling the movement of said carriage, a track parallel with the line of movement of said carriage, a sine bar, means for angularly positioning said sine bar relative to said track, frictional locking means to hold said sine bar in adjusted position, a control bar movably mounted on said carriage, a follower carried by said control bar for movement along said track and said sine bar, connections between said control bar, said carriage and said rack whereby movement of said control bar relative to said carriage causes movement of said carriage relative to said rack for line justification, and means connected with said carriage operable on carriage return for releasing said sine bar from adjusted position.

3. In a justifying typewriting machine, a movable paper carriage, an escapement rack on said paper carriage, variable space escapement mechanism for controlling the movement of said carriage, a track parallel with the line of movement of said carriage, a sine bar, means for angularly positioning said sine bar relative to said track, locking means to hold said sine bar in adjusted position, said locking means comprising a pair of interengaging smooth friction surfaces, a control bar movably mounted on said carriage, a follower carried by said control bar for movement along said track and said sine bar, connections between said control bar, said carriage and said rack whereby movement of said control bar relative to said carriage causes movement of said carriage relative to said rack for line justification, and means connected with said carriage operable on carriage return for releasing said sine bar from adjusted position.

4. In a justifying typewriting machine, a movable paper carriage, an escapement rack on said paper carriage, variable space escapement mechanism for controlling the letter space movement of said carriage, a track parallel with the line of movement of said carriage, a sine bar, means operated by carriage movement for angularly positioning said sine bar relative to said track, means to lock said sine bar in adjusted position, said locking means comprising a pair of interengaging a smooth friction surfaces, a control bar movably mounted on said carriage, a follower carried by said control bar for movement along said track and said sine bar, connections between said control bar, said carriage and said rack whereby movement of said control bar relative to said carriage causes movement of said carriage relative to said rack for line justification, and means operated by said carriage on carriage return for releasing said locking means to enable said sine bar to return to normal position.

5. In a justifying typewriter machine, a movable paper carriage, an escapement rack on said carriage, a variable spacing mechanism operative to control the movement of said carriage for variable spacing, a sine bar positionable at a variable angle relative to the line of movement of said carriage, a positioning member for said sine bar, means actuated by said carriage upon approaching the end of an unjustified typed line for moving said positioning member in proportion to the further movement of said carriage, a friction lock for holding said positioning member in any position to which it may be moved, a control bar movably mounted on said carriage, a follower carried by said control bar for movement along said sine bar whereby the sine bar governs the movement of the control bar, connections between said control bar, said carriage and said rack whereby movement of said control bar relative to said carriage causes longitudinal movement of said carriage relative to said rack for line justification, and means operable by return of said carriage for unlocking said positioning member whereby said sine bar is released from its adjusted position.

6. In a justifying typewriting machine, a movable paper carriage, a runway for said carriage, an escapement rack on said carriage, a variable spacing mechanism operative to control the movement of said carriage for variable spacing, a track parallel with the line of movement of said carriage, a sine bar pivotally connected to an end of said track and positionable at a variable angle relative to said track, said track and said sine bar being adjustable in a direction parallel to said carriage runway, a positioning member for said sine bar, means actuated by said carriage upon approaching the end of an unjustified typed line for moving said positioning member in proportion to the further movement of said carriage, a friction lock for holding said positioning member in any position to which it may be moved, a control bar movably mounted on said carriage, a follower carried by said control bar for movement along said track and said sine bar whereby the track and sine bar govern the movement of the control bar, connections between said control bar, said carriage and said rack whereby movement of said control bar relative to said carriage causes longitudinal movement of said carriage relative to said rack for line justification, and means operable by return of said carriage for unlocking said positioning member whereby said sine bar is released from its adjusted position.

7. In a justifying typewriting machine, a movable paper carriage, an escapement rack on said carriage, a variable spacing mechanism operative to control the movement of said carriage for variable spacing, a sine bar positionable at a variable angle relative to the line of movement of said carriage, a positioning member for said sine bar, means actuated by said carriage upon approaching the end of an unjustified typed line for moving said positioning member in proportion to the further movement of said carriage, an indicator to indicate the justification required, a friction lock for holding said positioning member in any position to which it may be moved, means to manually set said positioning member, a control bar movably mounted on said carriage, a follower carried by said control bar for movement along said sine bar whereby the sine bar governs the movement of the control bar, connections between said control bar, said carriage and said rack whereby movement of said control bar relative to said carriage causes longitudinal movement of said carriage relative to said rack for line justification, and means operable by return of said carriage for unlocking said positioning member whereby said sine bar is released from its adjusted position.

8. In a typewriting machine, the combination of a paper carriage, an escapement mechanism, a rack cooperating with said escapement mechanism, bell crank means pivoted on said carriage and operatively connected with said rack whereby rotative movement of said bell crank means causes a relative movement between said rack and said carriage, a sine bar adapted to control said bell crank means during a portion of the travel of said carriage, mechanism operated by said carriage to automatically set the inclination of said sine bar during a portion of the travel of said carriage, a member operatively connected to said sine bar, and means to frictionally engage said member to hold said bar in set position while the movement of the carriage is under the control thereof.

9. In a typewriting machine, the combination of a paper carriage, an escapement mechanism, a rack cooperating with said escapement mechanism, bell crank means pivoted on said carriage and operatively connected with said rack whereby rotative movement of said bell crank means causes a relative movement between said rack and said carriage, a sine bar adapted to control said bell crank means during a portion of the travel of said carriage, mechanism operated by said carriage to automatically set the inclination of said sine bar during a portion of the travel of said carriage, a member operatively connected to said sine bar and pivotally mounted for oscillation about an axis, said member having an arcuate surface concentric with said axis, and means to frictionally engage the arcuate surface of said member to hold said sine bar in set position while the movement of the carriage is under the control thereof.

10. In a justifying typewriting machine, in combination, a movable paper carriage, an escapement rack on said paper carriage, a differential letter-spacing escapement mechanism cooperating with the escapement rack for variably controlling the spacing movement of the paper carriage in accordance with the width of the character typed, justification mechanism for imparting movement to said carriage relative to said rack, means controlled by movement of said carriage for setting the justification mechanism, and a friction lock for holding the justification mechanism in any set position.

11. In a justifying typewriting machine, in combination, a movable paper carriage, an escapement rack on said paper carriage, a differential letter-spacing escapement mechanism cooperating with the escapement rack for variably controlling the spacing movement of the paper carriage in accordance with the width of the character typed, justification mechanism for imparting movement to said carriage relative to said rack, means controlled by movement of said carriage for setting the justification mechanism, and a friction lock operable from the typewriter keyboard for holding the justification mechanism in any set position.

CHARLES W. NORTON.

REFERENCES CITED

The following references are of record in the file of this patent:

UNITED STATES PATENTS

| Number | Name | Date |
| --- | --- | --- |
| 2,133,973 | Colton | Oct. 25, 1938 |
| 2,263,642 | Norton | Nov. 25, 1941 |